No. 742,757.

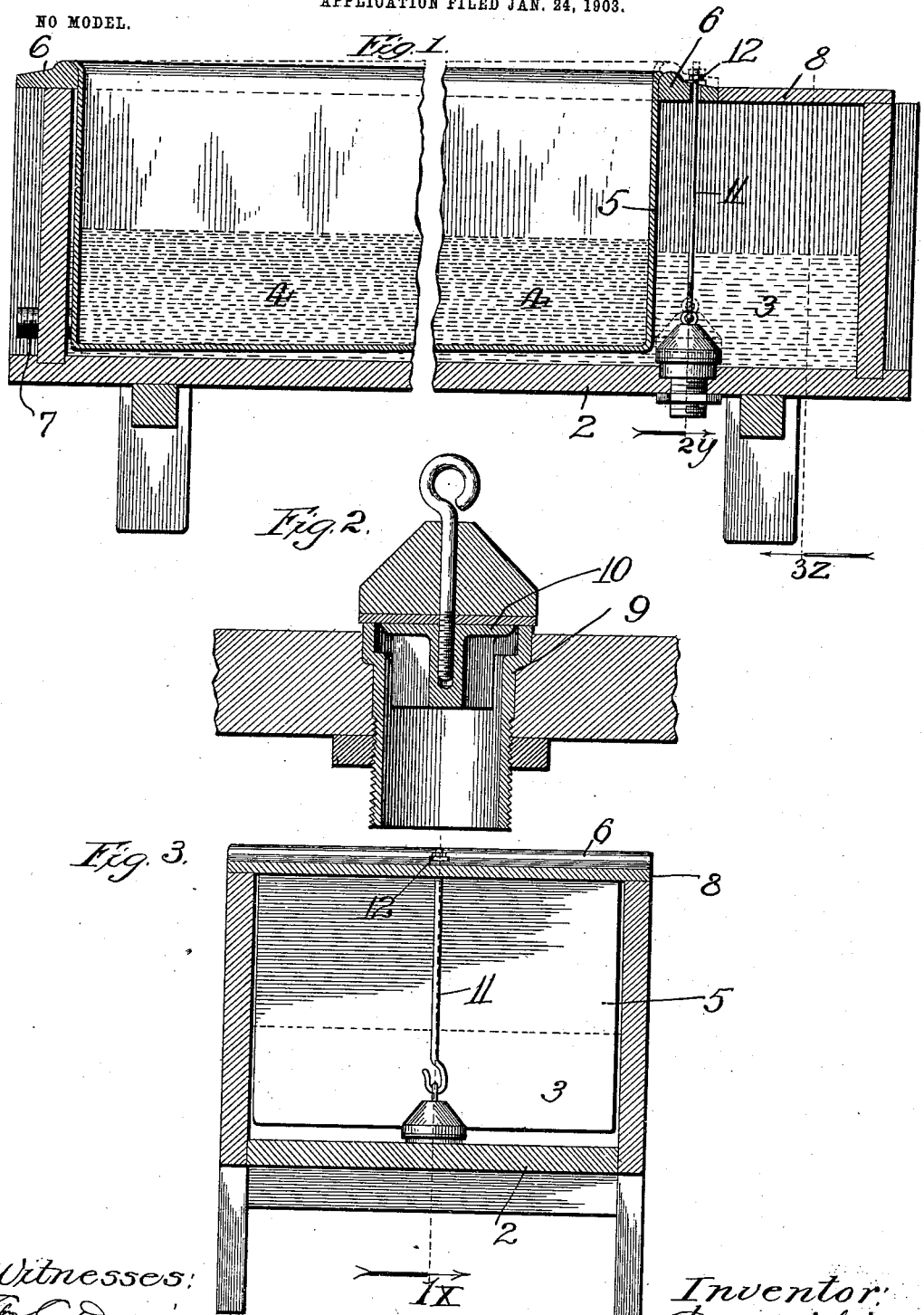

Patented October 27, 1903.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

SELF-EMPTYING VAT.

SPECIFICATION forming part of Letters Patent No. 742,757, dated October 27, 1903.

Application filed January 24, 1903. Serial No. 140,395. (No model.)

*To all whom it may concern:*

Be it known that I, THEODORE L. VALERIUS, a citizen of the United States, residing at Fort Atkinson, Jefferson county, Wisconsin, have invented a certain new, useful, and Improved Self-Emptying Vat, of which the following is a specification.

My invention relates to vats for milk, cream, and the like, and which are surrounded by a body of liquid contained in an inclosing tank, said liquid being employed for the heating or cooling of the milk or cream in the vat. Such devices usually comprise a light sheet-metal vat and a larger containing-tank in which there are numerous supports or cleats for the vat. These supports or cleats interfere with the circulation of the heating or cooling liquid in the tank, and, furthermore, these supports are but lightly, if at all, attached to the metal vat, and if the vat is emptied more rapidly than the containing-tank the pressure of the liquid in the latter is apt to buckle or collapse the metal vat.

My invention is directed toward the improvement of such devices, holding in view two main objects—namely, to dispense with the usual supports or cleats for the metal vat or lining and to make the device self-emptying as to the contents of the containing-tank, whereby the tank will be emptied automatically when the liquid contained in the vat is drawn off.

An incidental object of the invention is to provide a device of the class described in which the metal vat and its contents shall displace and be supported by the liquid surrounding it in the tank.

My invention consists generally in the liquid-containing tank, in combination with a vat suspended therein to be lifted or floated by the liquid in the tank and a tank-emptying valve connected with the vat and which is opened automatically whenever the weight of the vat and its contents becomes less than the weight of the liquid displaced thereby in said tank; and my invention consists, further, in various constructions and in combinations of parts, all as hereinafter described, and particularly pointed out in the claims.

The invention will be more readily understood by reference to the accompanying drawings, in which—

Figure 1 is a vertical longitudinal section of my self-emptying vat on the line $x$ of Fig. 3. Fig. 2 is an enlarged sectional view of the tank-valve on the line $y$ of Fig. 1, and Fig. 3 is a transverse vertical section on the line $z$ of Fig. 1.

My invention is particularly adapted and intended for cream and milk vats and is accordingly illustrated in the drawings.

As shown in the drawings, 2 represents a large tank. This is usually built of wood and contains a body 3 of either cold or warm water, which is employed for cooling or heating the contents 4 of the vat 5. The walls of the vat are of exaggerated thickness in the drawings—that is, the vat is usually made of light sheet metal and is much too light to alone sustain the weight of its contents, making it necessary to support the vat from the exterior. This is accomplished by the presence of the body of liquid 3 in the tank surrounding the vat.

The vat 5 is provided with a top rail 6, to which metal edges are secured. This rail 6 extends entirely around the vat and normally rests upon the upper edges of the tank 2, but is not secured thereto, leaving the vat free to float in the tank.

7 represents a short valved pipe connected with the vat and through which the contents of the vat may be drawn off. A large space, usually the ice-space, is left in the opposite end of the tank, and that end of the tank 2 is provided with the removable cover 8. Here I arrange the emptying-valve of the tank. The valve comprises the metal bushing 9, secured in the bottom of the tank, and the weighted valve-disk 10. This weighted disk or valve is connected with the rail 6 of the vat by a rod 11, which has a head or nut upon its upper end to be engaged by said rail 6. When the vat is in its normal depressed position, the valve is seated and the liquid in the tank is retained; but as soon as a portion of the liquid in the vat is removed or drawn off the weight of the vat will be less than that of the water displaced thereby in the tank, with the result that the vat will rise slightly, thereby lifting the valve 10 and permitting the water in the tank to drain out until the weights are compensated, whereupon the vat will settle and allow the emptying-valve to close. This action will be repeated whenever liquid is taken from the vat, and thus all danger of collapsing the vat is avoided. The lifting of the vat at the end opposite that containing the draw-off pipe 7 is so slight as to be permitted by the flexing of the metal vat. Therefore the connection with the pipe 7 is not disturbed.

Having thus described my invention, I claim as new and desire to secure by Letters Patent—

1. The combination of the tank with the depending vat, both adapted to contain liquids and the emptying-valve of the tank, connected with said vat, to be opened by the movement thereof when the weight of the liquid previously displaced in the tank by the vat exceeds the weight of the vat and its contents, substantially as described.

2. The combination of the tank 2, with the vat suspended therein, the rail of said vat normally resting upon the edges of said tank, the draw-off pipe of said vat, the emptying-valve of said tank, and a connection between said emptying-valve and said vat, automatically operating said valve, from the movement of the vat, substantially as described.

3. The combination of the tank with the smaller vat adapted for vertical movement therein, the weighted emptying-valve in said tank and the rod extending between the valve and vat, by which said vat lifts or opens said valve, as and for the purpose specified.

In testimony whereof I have hereunto set my hand, this 20th day of January, 1903, in the presence of two witnesses.

THEODORE L. VALERIUS.

Witnesses:
H. H. CURTIS,
CHAS. W. FERRIS.